United States Patent
Kwitek et al.

(10) Patent No.: US 12,223,776 B1
(45) Date of Patent: Feb. 11, 2025

(54) ELECTRIC VEHICLE RANGE DETECTION AND PROCESSING

(71) Applicants: Benjamin J Kwitek, Colorado Springs, CO (US); Scott C Harris, San Diego, CA (US)

(72) Inventors: Benjamin J Kwitek, Colorado Springs, CO (US); Scott C Harris, San Diego, CA (US)

( * ) Notice: Subject to any disclaimer, the term of this patent is extended or adjusted under 35 U.S.C. 154(b) by 0 days.

(21) Appl. No.: 18/191,460

(22) Filed: Mar. 28, 2023

(51) Int. Cl.
*G07C 5/00* (2006.01)
*B60L 58/12* (2019.01)

(52) U.S. Cl.
CPC .............. *G07C 5/004* (2013.01); *B60L 58/12* (2019.02); *B60L 2240/62* (2013.01); *B60L 2240/64* (2013.01)

(58) Field of Classification Search
None
See application file for complete search history.

(56) References Cited

U.S. PATENT DOCUMENTS

| | | | |
|---|---|---|---|
| 9,476,719 B2* | 10/2016 | Meyer | G01C 21/26 |
| 9,623,765 B2* | 4/2017 | Liu | B60W 10/08 |
| 2014/0214267 A1* | 7/2014 | Sellschopp | G06F 17/00 |
| | | | 701/34.2 |
| 2019/0178678 A1* | 6/2019 | Rahbari Asr | B60L 53/66 |
| 2020/0011687 A1* | 1/2020 | Lindemann | G01C 21/3469 |
| 2020/0333148 A1* | 10/2020 | Qiu | G01C 21/3476 |

* cited by examiner

*Primary Examiner* — James J Lee
*Assistant Examiner* — David Hatch
(74) *Attorney, Agent, or Firm* — Scott C Harris, Esq

(57) ABSTRACT

A vehicle monitoring system that monitors operation of a first vehicle on a road to determine an amount of fuel actually used by the first vehicle on each of a plurality of stretches of the road, and to use that amount of fuel used by the first vehicle on stretches of the road to determine an estimated range that a vehicle can travel based on a current fuel amount of the vehicle. The fuel is preferably electric charge. An embodiment crowd-shares the data between vehicles, so that a vehicle can get information about the battery consumption on an actual stretch of roadway.

14 Claims, 3 Drawing Sheets

ELECTRIC VEHICLE RANGE DETECTION AND PROCESSING

BACKGROUND

Conventional gasoline powered vehicles use a gas gauge to tell the user how much gasoline is remaining in the gas tank of their automobile, so that the user knows when to refill the tank.

Electric vehicles use a battery to provide their electromotive force. The amount of charge remaining in the battery indicates the amount of distance that the vehicle will be able to go before a recharge. Electric vehicles provide some kind of range indication of how far they can go before they will need recharging.

In 2023, as of the writing of this patent application, this can be more crucial, because there are fewer electric vehicle charging stations than gas filling stations, and often more distance between the charging stations. In rural areas, it is not unusual to go 60 miles or more without encountering an ability to recharge an electric vehicle.

SUMMARY

The inventors recognized that current systems for estimating and displaying the remaining range on electric vehicles have limitations.

The inventors believe that the systems for analyzing and estimating the range of the vehicles have typically relied on some kind of estimate from the vehicle's manufacturer, that in reality, is not very accurate.

The inventors recognize that real-world conditions are often very different than this estimate. In a typical situation, the user may start with a vehicle saying that it will have a first range before needing recharging, for example 300 miles. However, the reality of driving, including the speed driven, wind resistance, the number of hills, ambient temperature, amount of cooling or heating needed inside the vehicle, other electric loads in the vehicle, friction on the road, as well as many other real-world conditions, affects the actual distance that an electric vehicle will be able to travel before requiring a recharge of the battery.

The inventors found that in the real world, the vehicle indication that you have 300 miles before you recharge does not translate into 300 actual miles of range. Very often in the real world, the range is much lower than indicated.

Embodiments describe a system where a first vehicle monitors real-world conditions encountered by other vehicle(s), and obtains data from the movements of the other vehicle(s) and provides an estimate of range of the first vehicle based on these real-world conditions data from the movements of the other vehicles.

Embodiments describe, in this way, a "crowd-sourced" range information. This crowd-sourced range information can be specific to vehicle makes and models. The data can also be used to determine differences between vehicles and using that as data for future operations.

Another embodiment describes monitoring vehicle operation conditions, and providing information to the operator of the vehicle, whether that operator is a human operator or an AI style operator, about things that can be done to improve the range of the first vehicle.

BRIEF DESCRIPTION OF THE DRAWINGS

These and other aspects will now be described with reference to the accompanying drawings wherein.

The Drawings show aspects of the invention, and specifically.

DETAILED DESCRIPTION

Any of the embodiments described herein may be used together, or separate parts thereof can be used as separate embodiments.

Figure 1:
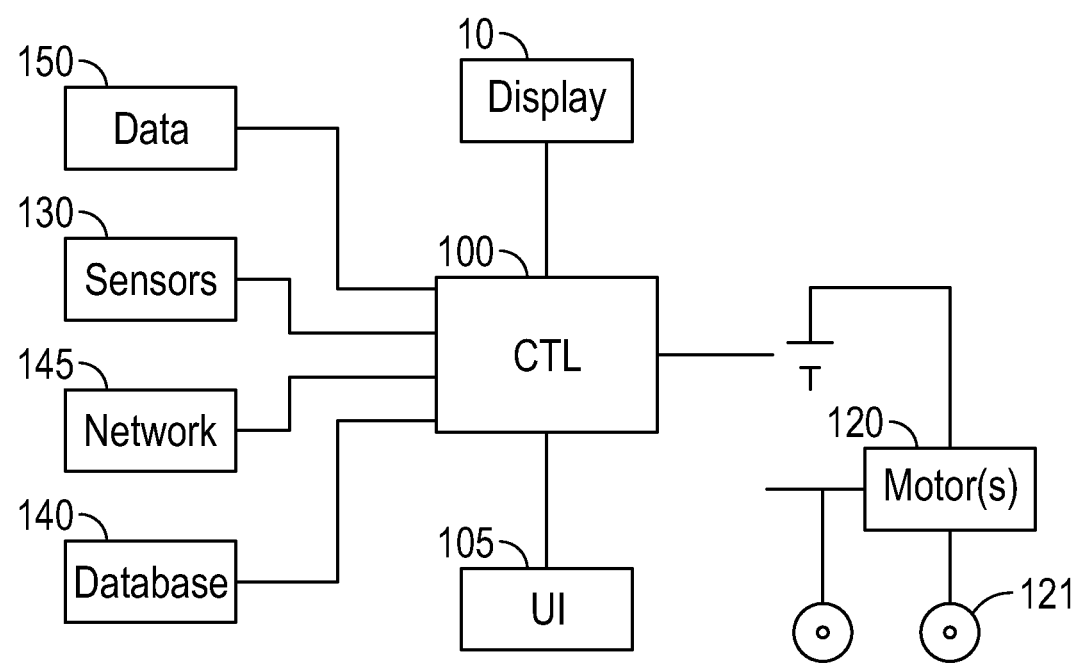
FIG. 1 shows a block diagram of a vehicle with the present system included.

FIG. 1 illustrates a vehicle block diagram which includes a controller 100, operating to control the operation of the vehicle, and to display certain statuses of the vehicle on a display 110. In operation, the controller receives input from the vehicle control the vehicle manual control, such as the vehicle pedal 105. The controller can also receive input for example from a user interface 105, e.g., a screen, which instructs the vehicle about how to operate in an autonomous mode. Based on this input, and the driver causing driving on the vehicle, the controller 100 causes charge from the battery 150 to be selectively applied to one or more of the motors 122 drive the wheels 121 of the vehicle.

The vehicle also includes a number of sensors such as 130 which can include camera(s) and radar type sensors such as LIDAR and other sensors. The vehicle includes a memory 140 that stores a database of information. The stored information includes both information about the vehicle as well as information about operation of other vehicles, obtained as described herein.

The controller can have a data connection 150, which can be Wi-Fi, cellular, or any other source of information received via the Internet or any other network.

In operation, the system operates according to the flowcharts described herein, which can be executed by the controller 100, or by another processing system, such as a cloud controller.

The system provides an improved display of likely range of the vehicle based on the destination and actual road conditions encountered by vehicles.

In one embodiment, described herein, the actual road conditions are those encountered by other vehicles, where those other vehicles more preferably have some similarity to the current vehicle.

An embodiment describes operating the system in the context of an electric vehicle, that is how much charge is left in the battery and consumed by the battery. In this context, the "fuel" is the charge remaining on the battery.

However, embodiments contemplate using these techniques in vehicles powered by other fuels, including a gasoline powered vehicle, hydrogen or CNG vehicle and that the system described herein is not limited to operation in an electric vehicle context. While at least some embodiments are described with reference to an electric vehicle, they can also be used and applied to a gasoline powered vehicle or vehicle using any kind of motive force, such as compressed gas, including hydrogen or CNG.

In other embodiments, the road conditions can be road conditions encountered by the actual vehicle in which the device is used but encountered at previous times. This embodiment can provide a good range estimate, based on the presumption that the same user will drive in the same way, and hence get similar mileage.

For example, in this embodiment of other vehicles, a Tesla model X may be at location a, and enter a destination, called destination y. The system calculates likely range of the vehicle based on other Tesla model x vehicles that have traversed the same stretch of roadway between a and y recently. The best estimate will be from the same kind of vehicle at a more recent time. In embodiments, the data can be from other vehicles on the same day, or same week, or other times. More recent data is more accurate, because of road conditions, traffic jams, temperature, light and dark, and other similarities.

In other embodiments, the system can monitor other Teslas, or other electric vehicles in general, to obtain the estimate.

Figure 2:
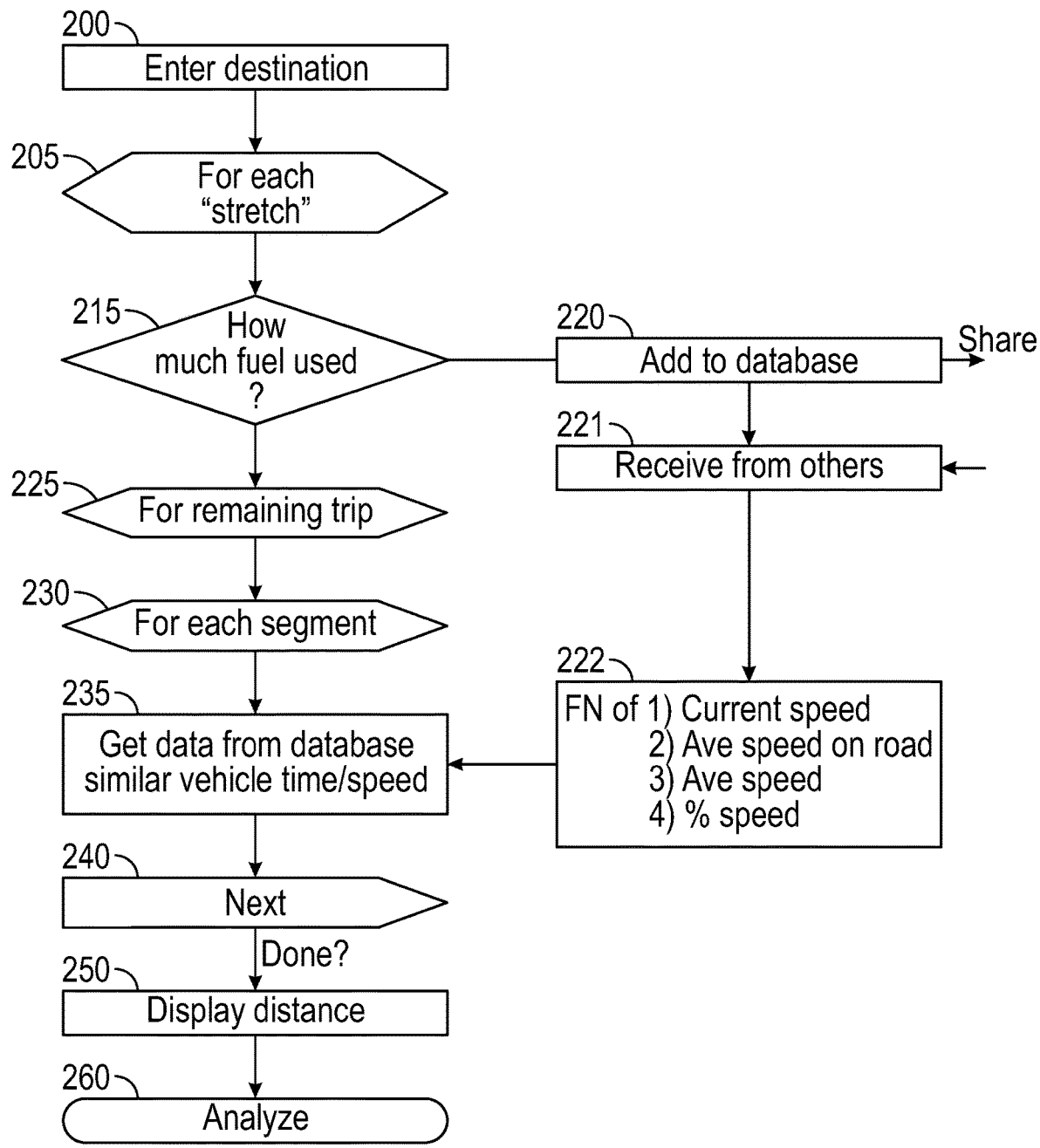
FIG. 2 shows a flowchart of operation of determining a more accurate distance.

An operation of the range estimating and determining system is illustrated in FIG. 2. The user enters the destination at 200. The path from current location to destination is going to be formed of multiple stretches of roadway. For a long-distance destination, there will typically be one or multiple roads, turns and highways.

At 205, each time the vehicle has traversed a stretch of roadway, the system determines at 215 how much fuel has been used to traverse that stretch of roadway. In different embodiments, the stretch of roadway can be defined in different ways. The stretches of roadway are defined between roadway markers, where the markers are not necessarily physical markers, but are different ways that the roadway can be broken up logically. One roadway marker may be a stretch of roadway can be defined between adjacent mile markers e.g. between mile marker 150 and 151 on a particular highway.

For other roads and segments, such as stretches of the roadway between an entrance and exit ramp and the mile marker, and stretches of roadway that are not mile marked, such as back roads, each road or segment may be considered separately. A stretch of roadway on a road can be defined for example between each two adjacent traffic lights, or each two adjacent intersections.

In the embodiment, described herein, where the fuel is based on charge from a battery, a current analysis of battery consumption is carried out for each of those stretches of roadway at 215, the system determines an amount of battery charge that was used on the stretch of roadway. This can be done by determining how much battery charge is used over the course of that stretch. This could be an absolute amount of joules used, or a percentage of the battery charge that was used. This is correlated with data about the roadway stretch.

At 220, the data, including miles per hour, time of day, and amount of battery charge used are added to a database.

This database defines data for current traverse. The data in this database is shared with others driving other vehicles that will be travelling on that same stretch of roadway in the future. Similarly, other databases from other vehicles will be shared with the current vehicle, shown as being received at 221.

Beginning at 225, the future analysis of the trip begins. At 225, the system analyzes for the remaining part or segment of the trip, The segment of the trip, for example may be a portion of the trip before the user will stop to recharge their battery.

The system operates to determine, for each stretch of roadway at 230, a likely amount of battery consumption based on the data it has obtained. This data can be sorted at 222 by current speed of the current vehicle, average speed on the road of the current vehicle, average speed of all vehicles, or percentage speed where the percentage speed comprises the percentage over or under the current miles per hour that the current vehicle is traveling. These sort options can be set as options by the user, or selected, e.g, by pressing on the touchscreen on the trip segment. In one embodiment, the display can show a number of remaining miles, and show next to it a currently used option, e.g, at current vehicle current speed. Pressing again on the screen then advances to the next option, of average speed. Pressing again gives you the average speed on road. Finally, pressing again displays a percentage speed. As an alternative, when the user presses and holds the range, the system can pop up and display all the different options.

The system can also, for example, display the best and worst options, such as best option at current speed x miles, worst option at average speed y miles.

Information from other vehicles received at 221 can be a filtered list in one embodiment, such as from a similar road. In another embodiment, this can be an unfiltered list, of all vehicles from all different roadways and may be filtered by the range estimating system.

In one embodiment, this uses data from the database of similar vehicles at similar times, and similar speeds to determine an amount of battery charge used for each increment (e.g. each mile). This continues for the next mile at 240, until ending, where all the amounts of charge are added up, and the calculated distance that the vehicle can operate is displayed at 250.

Another aspect of this system is an analysis aspect, which can assist the user in determining what they should do to maximize the driving range and/or minimize their total drive time. By selecting an analyze command at 260, an analysis of operation begins.

The analysis function operates to analyze and advise the user what they can do to stretch the number of miles that the user can travel can have on the existing charge, and/or minimize the total time of the trip including stops for refueling.

Figure 3:
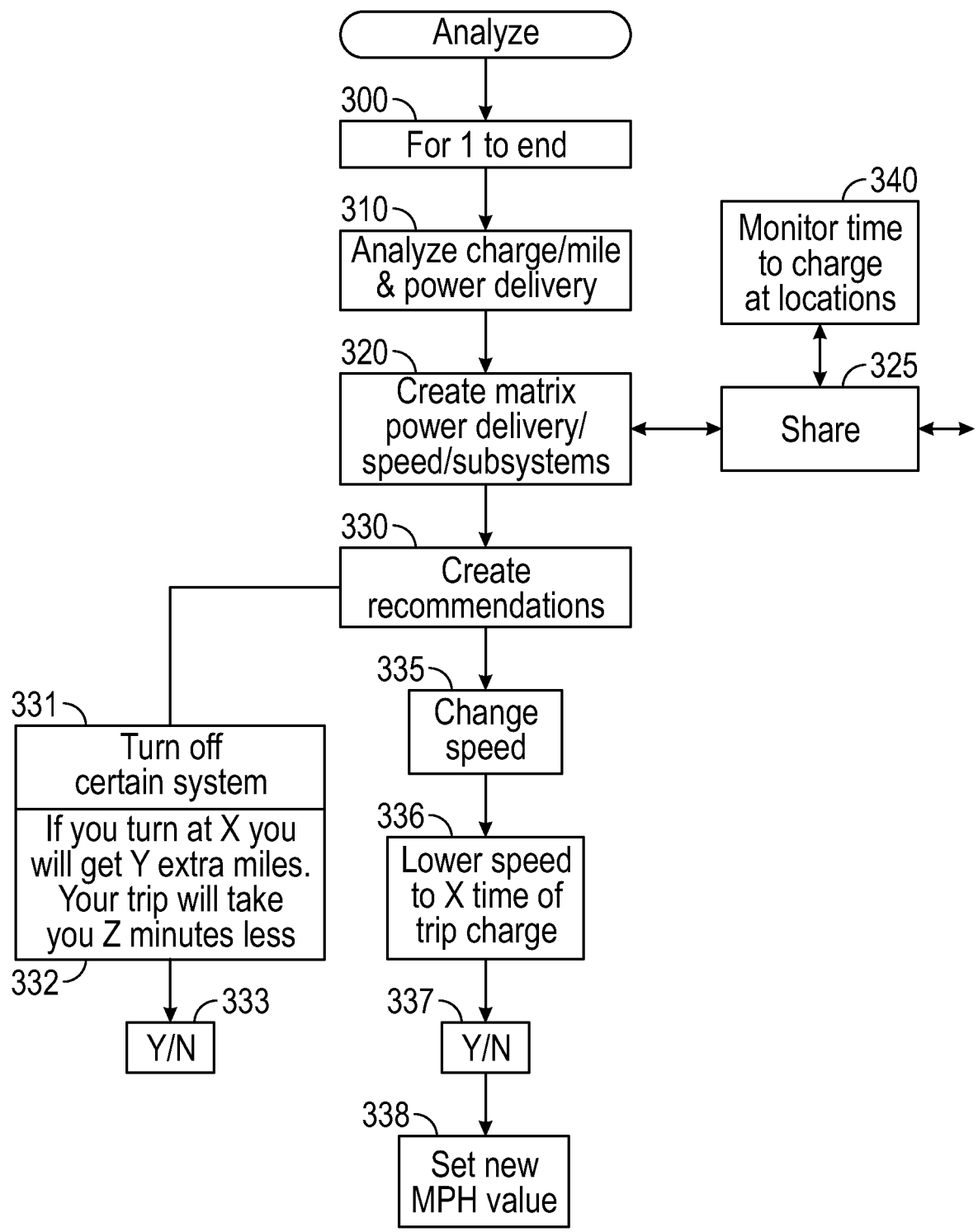
FIG. 3 shows an analyze and recommendation system flowchart.

FIG. 3 shows the analyze flowchart, and it should be understood that some or all of this flowchart can be carried out at any given time. For example, the user can only decide how to stretch their miles, or can only decide how to minimize the total time of their trip or part of their trip. Again, as described above, the system can be used in an electric vehicle system, but can also be used in a gasoline or other motive powered system.

At 300, for each remaining segment of the trip 1 to end, the system analyzes the fuel consumption per unit, e.g., charge consumption per mile, and the likely breakdown of that charge consumption per mile at 310 at different operating levels. This can use either data from the actual vehicle, or data from a global fleet of vehicles which are similar to the actual vehicle. This can use today only trip information, or from other days. In one embodiment, the system can determine the power delivery target per segment, including what parts of the fuel consumption went to different systems of the vehicle. This can include what part of the consumption went to the drive, and what part(s) went to auxiliaries: e.g., heat and cooling, data and other processing, displays in the vehicle, lights, and any other consumer of power. This analyzes what parts of the power were delivered to different systems in the vehicle. The analysis also determines how the consumption will vary at different operating characteristics of the vehicle, such as faster or slower speed.

At 320, the system creates a matrix, between the power delivered, the speed and other operational characteristics of the vehicle, and which subsystems were active and receiving different amounts of power. It is also contemplated, for example, that operating at a specified speed may use more power when additional subsystems are also active, and less power to travel at the same speed when those additional subsystems are not active.

At 325, the data in this matrix is shared with others, and also data from other matrices of other similar vehicles is received. Hence, this can operate not only based on the vehicle's own information, but also from crowd-sourced information received from other vehicles.

In one embodiment, the fuel consumption per mile can be characterized in terms of miles per hour in increments such as 2 miles an hour increments. Because of the different characteristics of wind resistance and motor effectiveness, the system may use different amounts of charge per mile at different speeds.

The system can also use different charge per mile at different ambient temperatures, and at different times of day. The system can use more at night then it uses during the day because the lights are on. 320 can also uses data from similar vehicles to analyze and create this matrix. More similar vehicles that are closer in time provides a more accurate matrix. The best matrix would be obtained from different vehicles that were passing through the same area within minutes or hours, however different vehicles passing at similar times of different days may also be used albeit for somewhat less accurate information. Global information from the crowdsourced fleet of vehicles is preferred.

Once the matrix is formed at 320, the data in that matrix is used to create recommendations at 330 of different things that the user can do in order to stretch their fuel to last a little bit longer, and/or to optimize their driving characteristics to minimize the time of their complete trip.

A first recommendation can be a recommendation to turn off certain systems. For example, if the user has devoted 5% of their power to driving entertainment systems, the recommendation at 331 can include a recommendation to turn off certain systems. This can include turning off the main display, or using the screensaver on the main display, or turning off parts of the main display. An embodiment can turn off all of the main display except for those parts needed to drive accurately such as the speedometer. This can be used to recommend to turn off the heat or AC, turn off the seat heaters, turn off lights or high beams, or any other electrical or mechanical load in the vehicle.

The recommendation at 332 is in the form of "if you turn off x, you will get y extra miles". This recommendation can be based on either the vehicle's own operation of battery charge used per mile, and how that would change if items were turned off or otherwise changed. The recommendation can alternatively be based on crowdsourced information, such as what charge other vehicles used when they operated with and without certain systems operating.

The recommendation at 332 can also include a total trip time estimate, which indicates how much shorter the trip will be if this is done. The trip may be shorter in time because the user will have to refuel less often, calculated at 332. At 333 the user is provided with a prompt to see if they want to carry out this or any other actions.

Another recommendation at 335 is a speed recommendation. Speed recommendations are based on different vehicles going different speeds. One recommendation at 336, is if you lower your speed to x, then you will get y extra miles and the total time for trip will change by Z. This could make the trip last longer, or even make the trip less shorter, since less refueling will be necessary. The user is given an option at 337 to accept this or not accept it.

If the user accepts this, then the new speed is set at 338. This can change the vehicle's automated driving system to that new speed. The system can also include an alarm, which is played or displayed to the user if they exceed that speed by more than a specified amount, e.g., by more than 10 mph, or more than 10%.

The time of trip changes at 332 and 336 are based on a calculation of how long different things will take at different charge levels. If the user reduces their speed or reduces some system, the system can calculate that the user gets an extra number of miles, e.g 20 miles more, before refueling, e.g, recharging. The recommendation can also include an estimate of how long it will take the user to recharge. The system monitors an amount of time it will take to recharge at different locations at 340. For example, if the user recharges at the location a, it takes an average of 8 minutes including exiting the road, finding the charger, and charging. Recharging at location B, which is a different takes an average of six minutes. By reducing their speed limit, therefore, the user may actually get to their location faster by enabling the choosing of a faster charging station, or by charging less often, or choosing less charging amount or by recharging less.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A vehicle system, comprising:
a vehicle controller comprising a computer that monitors operation of a first vehicle on a road to determine an amount of fuel used by the first vehicle on each of a plurality of stretches of the road, and to use said amount of fuel used by the first vehicle on stretches of the road to determine an estimated range that a vehicle can travel based on a current fuel amount of the vehicle, wherein the vehicle controller determines a total amount of time that it will take to refuel the vehicle at different locations, the total amount of time including time for exiting the road from the current route, finding a vehicle refueler, and actually refueling at the refueler and providing information about the total amount of time it will take to refuel including the time for exiting the road from the current route, finding the vehicle refueler, and the refueling at different locations to the user, and the vehicle controller providing parameters for the vehicle, to minimize a total time of a trip and the vehicle controller operating the first vehicle according to these parameters to minimize the total time of the trip.

2. The system as in claim 1, wherein the vehicle controller monitors operation of a first vehicle on a road to determine an amount of fuel actually used by the first vehicle on each of a plurality of stretches of the road, and to use said amount of fuel used by the first vehicle on stretches of the road to determine an estimated range that a vehicle can travel based on a current fuel amount of the vehicle.

3. The system as in claim 2, wherein the vehicle is a second vehicle, and the first vehicle and the second vehicle are different vehicles, wherein the first vehicle and the second vehicle share information about amounts of fuel used by the first and second vehicles on each of a plurality of stretches of the road and the vehicle controller monitors the operation of the first vehicle at a first time, prior to a time when the second vehicle will travel on the stretches of the road.

4. The system as in claim 3, wherein the monitoring system operates to obtain data from a first vehicle that is the same model vehicle as the second vehicle.

5. The system as in claim 2, wherein the stretches of roadway are defined between different roadway markers.

6. The system as in claim 1, wherein the amount of fuel is a level of battery charge, and the vehicle refueler is a vehicle recharger, and the time for actually refueling at the refueler is a time for battery charging.

7. The system as in claim 1, further comprising the vehicle controller analyzing what parts of power delivered to the vehicle that went to different systems in the vehicle,
and the vehicle controller providing an output that indicates how to extend the range of the vehicle by turning off different systems in the vehicle, and the vehicle controller determines whether turning off different systems in the vehicle will reduce a total time of the trip, and the vehicle controller turns off the different systems in the vehicle to reduce the total time of the trip.

8. The system as in claim 1, wherein the vehicle controller analyzes fuel consumption at different speeds, and determines a total time to an end of a trip at the different speeds including the time to refuel at the different locations.

9. The system as in claim 8, wherein the vehicle controller indicates to a user a reduction in a total time for a trip including an amount of time take to refuel the first vehicle, the reduction in total time caused by changing a vehicle parameter, and the vehicle controller operating to change the parameter.

10. The system as in claim 1, wherein the vehicle controller storing information about the amount of fuel used by the first vehicle into a database;
the vehicle controller sharing the database with a second vehicle;
the vehicle controller receiving information into its database indicating information about an amount of fuel used by a third vehicle on stretches of road that will be traversed by the first vehicle in the future, and using the information from the database about the amount of fuel used by the third vehicle on the stretches of road to determine an estimated range that the first vehicle can travel based on a current fuel amount of the first vehicle.

11. The system as in claim 1, wherein the refueler is a battery charger, and where the vehicle refueler is a vehicle charger, and the refueling is charging a battery of the vehicle.

12. A vehicle system, comprising:
a vehicle controller, including a computer, that monitors operation of a first vehicle on a road to determine a total amount of time taken to refuel the first vehicle at a first location including the time for exiting the road from the current route, finding the vehicle refueler, and the refueling;
a database that stores the total amount of time taken to refuel the first vehicle at the first location;
the database receiving total amounts of time taken to refuel other vehicles at other locations, from the other vehicle, including the time for exiting the road from the current route, finding the vehicle charger, and the charging and the database sharing the amount of time taken to refuel the other vehicle at the other location; and
the controller receiving an indication from the vehicle of a desired trip destination and estimates different times to get to the desired trip destination including refueling at the different locations;
the controller determining fuel consumption from turning off electrical or mechanical loads in the vehicle,
the controller determining if a trip will get shorter in time by turning off the loads in the vehicle, and providing instructions to the user to turn off the loads in the vehicle, responsive to the determining, and turning off the loads to make the trip shorter in time.

13. The system as in claim 12, wherein the vehicle controller also monitors fuel used by the first vehicle on each of a plurality of stretches of the road,
the vehicle controller storing information about the amount of fuel used by the vehicle into the database;
the vehicle controller sharing the database with a second vehicle;
the vehicle controller receiving information into its database indicating information about amount of fuel used by a third vehicle on stretches of road that will be traversed by the first vehicle in the future, and using the information from the database to determine an estimated range that a vehicle can travel based on a current fuel amount of the vehicle.

14. The system as in claim 13, wherein the fuel is a level of battery charge, and the vehicle controller using the actual amount of battery charge used by a different vehicle on a same actual stretch of roadway to estimate the estimated range.

* * * * *